(12) United States Patent
Eck

(10) Patent No.: US 10,460,040 B2
(45) Date of Patent: Oct. 29, 2019

(54) LANGUAGE MODEL USING REVERSE TRANSLATIONS

(71) Applicant: Facebook, Inc., Menlo Park, CA (US)

(72) Inventor: Matthias Gerhard Eck, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/194,249

(22) Filed: Jun. 27, 2016

(65) Prior Publication Data

US 2017/0371866 A1    Dec. 28, 2017

(51) Int. Cl.
*G06F 17/28* (2006.01)
*G06F 17/27* (2006.01)

(52) U.S. Cl.
CPC ...... *G06F 17/2845* (2013.01); *G06F 17/2818* (2013.01); *G06F 17/27* (2013.01); *G06F 17/2715* (2013.01); *G06F 17/28* (2013.01)

(58) Field of Classification Search
CPC ...... G06F 17/27; G06F 17/2715; G06F 17/28; G06F 17/2818
USPC ....... 704/2, 3, 4, 5, 235, 246, 270, 275, 277
See application file for complete search history.

(56) References Cited

U.S. PATENT DOCUMENTS

| | | | |
|---|---|---|---|
| 5,855,000 A | 12/1998 | Waibel et al. | |
| 8,543,563 B1* | 9/2013 | Nikoulina | G06F 17/2809 704/2 |
| 2007/0048715 A1* | 3/2007 | Miyamoto | G06F 17/2745 434/308 |
| 2010/0070521 A1* | 3/2010 | Clinchant | G06F 17/30669 707/760 |
| 2011/0063503 A1* | 3/2011 | Brand | H04N 5/4401 348/500 |
| 2015/0248401 A1* | 9/2015 | Ruvini | G06F 17/289 704/2 |
| 2016/0140111 A1* | 5/2016 | Mirkin | G06F 17/289 704/2 |

* cited by examiner

*Primary Examiner* — Feng-Tzer Tzeng

(57) ABSTRACT

Exemplary embodiments relate to techniques for improving machine translation systems. The machine translation system may apply one or more models for translating material from a source language into a destination language. The models are initially trained using training data. According to exemplary embodiments, supplemental training data is used to train the models, where the supplemental training data uses in-domain material to improve the quality of output translations. In-domain data may include data that relates to the same or similar topics as those expected to be encountered in a translation of material from the source language into the destination language. In-domain data may include material previously translated from the source language into the destination language, material similar to previous translations, and destination language material that has previously been the subject of a request for translation into the source language.

17 Claims, 9 Drawing Sheets

LANGUAGE MODEL USING REVERSE TRANSLATIONS

BACKGROUND

Machine translations involve the translation of information from a source language to a destination language via a computing device. Machine translations may be used to translate, for example, advertisements, government documents, academic works, text messages and emails, social networking posts, recordings of spoken language, and numerous other works.

There may be more than one possible way to translate a word, phrase, or sentence into the destination language. Although each of these possible translations may be correct in certain circumstances, some translations may not make sense in the context of the full translation. For example, assume that the phrase "very good" is translated into German. The word "very" is typically translated as "sehr". However, the word "good" may be translated in different ways depending on the way that it is used. For example, the "good" in "good morning" is typically translated as "guten", whereas the "good" in "that food is good" may be translated as "gut". In this case, both "gut" and "guten" are reasonable translations of the word "good", but "sehr gut" is a more preferable translation than "sehr guten".

In order to determine which of multiple possible hypotheses is the most preferable, the translation system may apply a language model. The language model may, for example, consider how the translated word is used in the context of the larger translation. If one of the hypotheses is more likely than the others, the language model may recommend that hypothesis.

For example, consider a request to translate the phrase "la casa blanca" from Spanish into English. The language model may receive two hypotheses for the term "casa". The first hypothesis may be "house", while the second hypothesis may be "home". Both are reasonable hypotheses for the translation of the word "casa" into English. However, in the context of the broader translation, which characterizes the "casa" as being "blanca", it is more common to translate the word as "house" (i.e., "the white house") rather than "home" (i.e., "the white home"). The language model is trained to analyze the context in which the translation appears, and identify which of the hypotheses is more likely.

SUMMARY

The present application is related to improvements in training translation systems so that the translation systems are more likely to generate a correct or preferable translation. According to exemplary embodiments, supplemental training data is provided to the translation system. The supplemental training data is "in-domain" training data that includes destination language material relating to the kinds of topics that are likely to be discussed in materials that are subject to requests for translation from the source language to the destination language. Because the training data is in the same domain as the subject matter of the translations, the output of the translation system is more likely to be accurate, grammatically correct, or otherwise preferable to translations produced by a translation system that has not been trained with the supplemental data.

In-domain supplemental data may take several forms. For example, in-domain supplemental data may include destination language materials that were obtained by translating source language materials into the destination language, material similar to translated destination language materials, and destination language material that is associated with a previous request for translation into the source language.

The in-domain supplemental data may be used to train a language model that is applicable to translate source language ($L_a$) material into destination language material ($L_b$). In some embodiments, multiple $L_a \rightarrow L_b$ language models, each customized to particular demographic or user group, may be used to further refine the translations produced by the translation system.

These and other features and advantages will be described in more detail with reference to the attached drawings.

DETAILED DESCRIPTION

Exemplary embodiments relate to techniques for improving a machine translation system by training the language system's language model using in-domain training data.

Conventionally, a language model that is used to translate material into a destination language $L_b$ are trained using general material in the destination language $L_b$ (e.g., destination language news stories, publications, and other destination language materials). Because the language model for the destination language $L_b$ is trained on monolingual destination language training data, a single language model can be used to translate from multiple different source languages $L_{a1}, L_{a2}, L_{a3}, \ldots$ into a given destination language $L_b$. For example, the translation system may receive a request to translate a Portuguese document into English, and may receive a request to translate a Japanese document into English. An English language model may be used to ensure that English-language ($L_b$) output is correct, regardless of the source language ($L_a$) the original material.

Figure 1A:
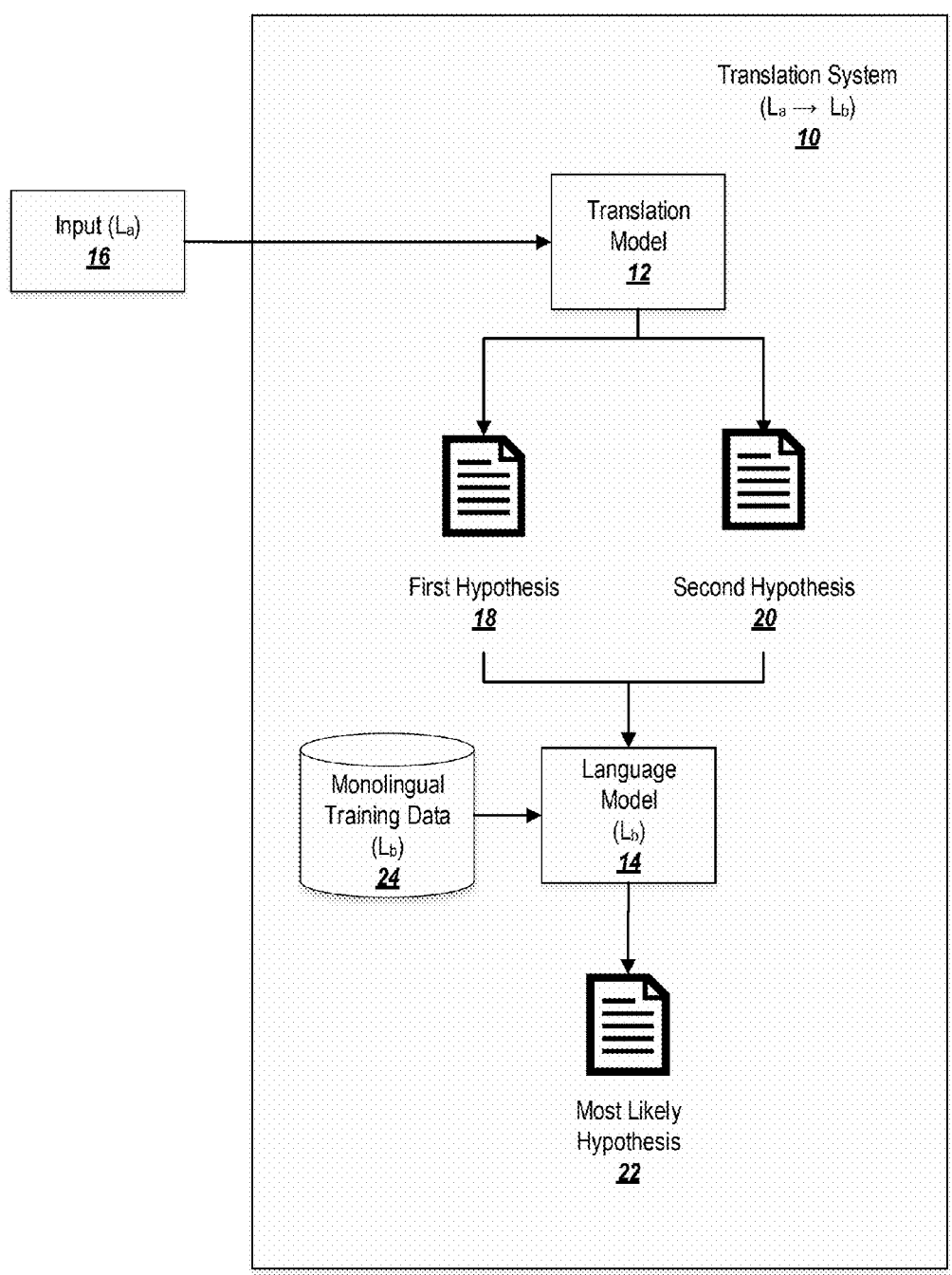
FIGS. 1A-1B depict a simplified example of a system for improving translation systems by training a language model using supplemental training data.

For example, FIG. 1A depicts an exemplary translation system 10 for translating source material in a source language $L_a$ into destination language $L_b$. The translation system 10 includes a translation model 12 and a language model 14.

The translation model 12 accepts an input 16 in the source language $L_a$ and generates one or more hypotheses that represent equivalent destination language $L_b$ words or phrases. For example, the translation model 12 may receive the Spanish source-language word "casa" and may be asked to translate this word into English. The translation model 12 may generate a first hypothesis 18 of "house", and a second hypothesis 20 of "home".

The translation model 12 sends the hypotheses to the language model 14, which looks at the hypotheses in the context of the larger translation. For example, if the language model 14 identifies that the word after "casa" is translated as "white", the language model 14 may output "house" as the most likely hypothesis 22.

In order to identify which hypothesis is most likely, the language model 14 is trained using monolingual destination language ($L_b$) training data 24. Essentially, the language model 14 analyzes a large number of destination language ($L_b$) phrases, sentences, etc., and learns the grammatical and other rules for the destination language ($L_b$). This allows the language model 14 to better identify which of the hypotheses 18, 20 is more likely.

According to exemplary embodiments, the language model 14 may be improved by supplementing the monolingual training data 24 with "in-domain" supplemental training data. In-domain data includes data that is relevant to topics that are likely to be discussed in materials that are subject to translation requests from the source language to the destination language.

For example, a Portuguese-language document that is translated into English may address topics such as "Brazil", "football" or "soccer", "Lisbon", "Europe", etc. On the other hand, a Japanese-language document that is translated into English may address topics such as "Tokyo", "baseball", "sushi", etc. In these examples, materials translated from different source languages (Portuguese and Japanese, respectively) into a common destination language (English) each included different topics of discussion. The reverse is also possible. For example, a document translated from Spanish to English may be likely to discuss topics such as "baseball", "Mexico", or "Caribbean islands", whereas documents translated from Spanish to German may be more likely to discuss topics such as "football", "prime minister", "euro", etc. In these examples, documents translated from a common source language (Spanish) into different destination languages (English and German, respectively) discussed different topics.

Generally, a language model 14 for a translation system 10 is trained on a large amount of general monolingual data. For example, an English language model may be trained on about 100 million English-language training sentences. Although the training data includes a great deal of information, only a relatively small amount of this information will be in-domain when the language model 14 is applied to translate different source language materials into English. For example, only a few training examples may relate to baseball, or Caribbean islands, and therefore the language model 14 may not be particularly adept at recognizing grammatical or other inconsistencies when discussing these topics. However, these topics are likely to be relatively common when translating materials from particular source languages, which means that these inconsistencies are likely to be readily apparent to users of the translation system.

Figure 1B:
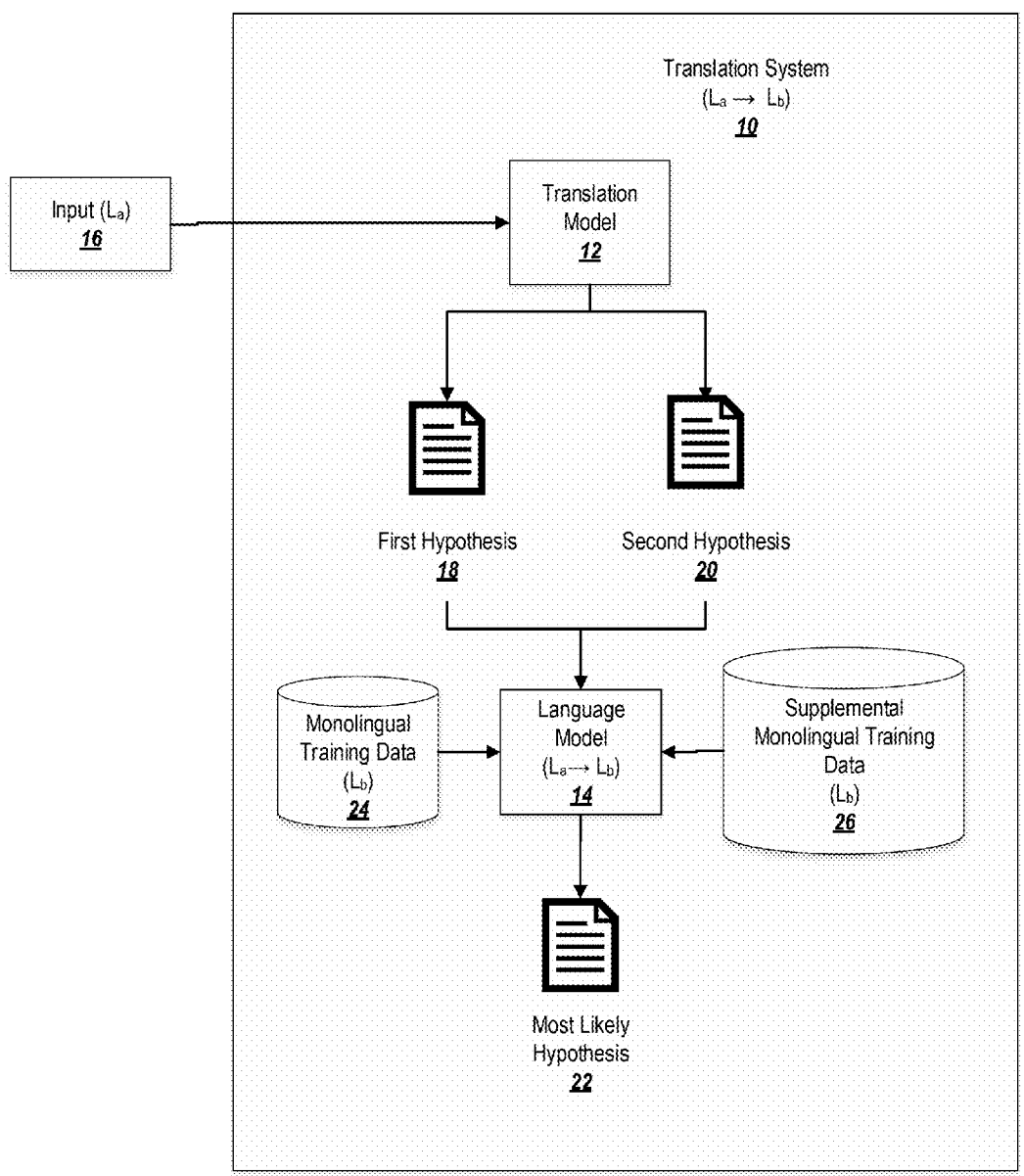

An example of providing supplemental training data is depicted in FIG. 1B. In addition to the monolingual training data 24 that trains a general-purpose destination language ($L_b$) language model 14, supplemental monolingual training data 26 in the destination language $L_b$ is also used to train the language model 14. This converts the general purpose language model ($L_b$) 14 into a special-purpose language model ($L_a \rightarrow L_b$) 14 that is trained for, and therefore particularly well-suited to, addressing topics that are likely to be encountered when translating materials from the source language $L_a$ into the destination language $L_b$. In order to accommodate different source language/destination language ($L_a/L_b$) pairs, the translation system 10 may train multiple different language models 14 with different types of supplemental monolingual training data 26.

The special-purpose language model ($L_a \rightarrow L_b$) 14 of FIG. 1B could still be applied to translate from other languages, other than the source language $L_a$ for whose topics it was specifically trained. The special purpose language model ($L_a \rightarrow L_b$) 14 is, nonetheless, likely to perform better than a general purpose language model ($L_b$) when translating from the source language $L_a$ to the destination language $L_b$.

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Next, an overview of the machine translation system is provided.

Machine Translation System

Figure 2:
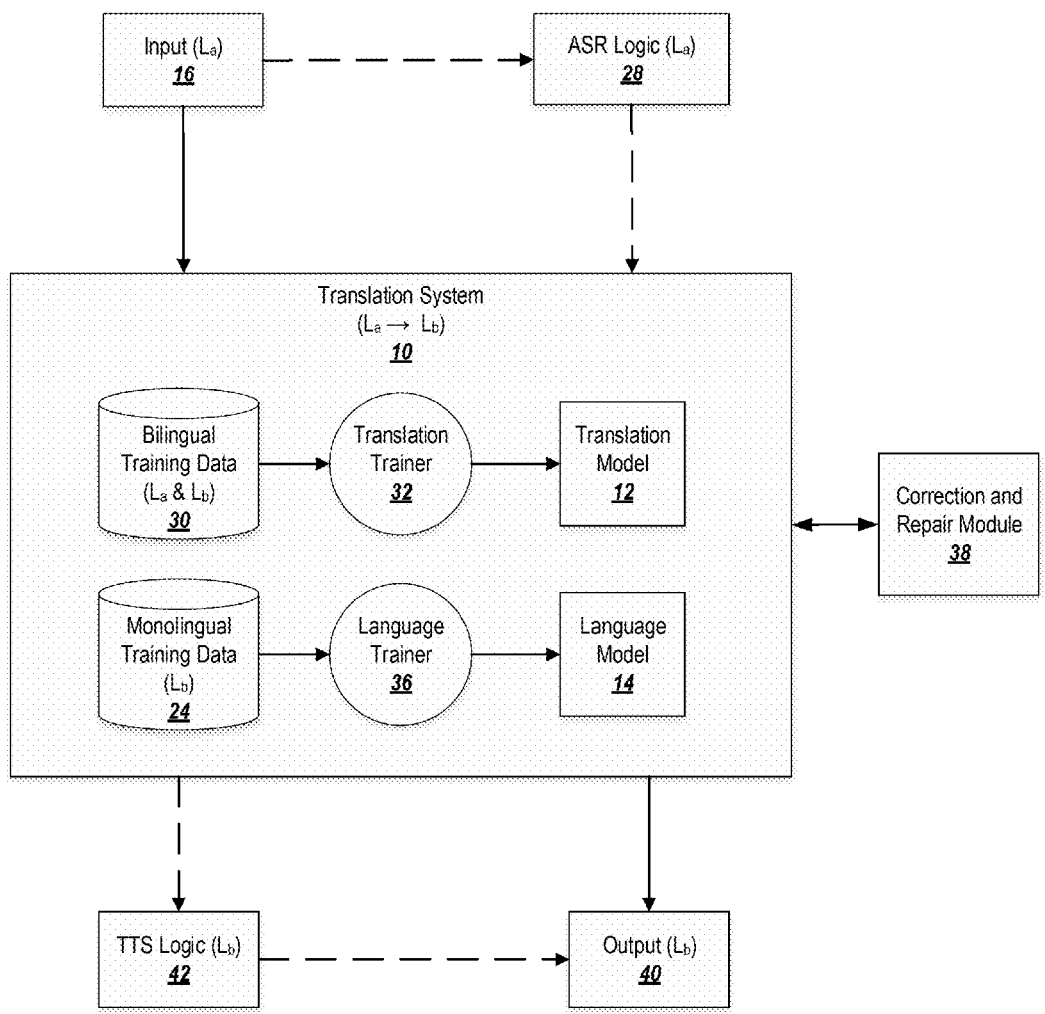
FIG. 2 is a block diagram illustrating a translation system constructed according to an exemplary embodiment.

FIG. 2 is a block diagram overview of an example of a translation system suitable for use with exemplary embodiments. FIG. 2 depicts a unidirectional system in which a translation is performed from $L_a$ to $L_b$; however, the present invention is not so limited. The translation system may be bidirectional, performing translation in both directions (from $L_a$ to $L_b$ and from $L_b$ to $L_a$). Moreover, a multi-directional system involving several languages $L_1 \ldots L_n$ could equally benefit from the present invention.

An input 16 may be provided to the machine translation system. The input 16 may be in the form of text in the source language $L_a$, such as text input from a keyboard via a web browser or application. The input 16 may also take other forms, such as an audio recording, writing provided directly to a computing system through a stylus or electronic pen, writing indirectly provided to a computing system (e.g., by scanning a handwritten or typed document), a photograph (e.g., a photograph of a sign), and other suitable types of input. In order to provide the input 16, a user may interact with the system via a graphical user interface displayed on a computing device screen (or active touch screen), a pointing device such as a mouse or pen, a microphone, and/or a keyboard.

In some embodiments, the translation system 10 is operable to translate textual information from the source language $L_a$ to the destination language $L_b$. Accordingly, in order to handle multiple different types of inputs 16, logic may be provided for converting the input 16 into text. For example, FIG. 2 depicts automatic speech recognition (ASR) logic 28 that is configured to convert input audio in the source language $L_a$ into text in the source language $L_a$. In order to convert an audio recording to text, the ASR logic may utilize an acoustic model, an ASR class-based language model, and a recognition lexicon model. One example of suitable ASR logic is the "Ninja" speech recognizer system developed at Mobile Technologies, LLC. Other types of ASR logic that may be used include speech recognizers developed by IBM Corporation, SRI, BBN, the University of Cambridge, or Aachen University.

Other types of logic may be provided for other types of inputs 16 (e.g., optical character recognition logic for converting input handwriting or typing, image analysis logic for converting input photographs, etc.). If the translation system operates on something other than text (e.g., audio), suitable logic may be provided for converting the input 36 into a format recognizable to the translation system.

The input 16 is provided to a translation system 10 (potentially after being processed by the ASR logic 28 or other suitable logic). The translation system 10 is configured to translate the input 16 from the source language $L_a$ into the destination language $L_b$. Examples of translation systems 10 suitable for use with exemplary embodiments include the "PanDoRA" system developed at Mobile Technologies, TTC, as well as machine translation systems developed by IBM Corporation, SRI, BBN or at Aachen University.

Generally, the translation system 10 applies a translation model 12 to source language words, phrases, sentences, etc. in the input 16 in order to develop a list of plausible candidate destination language words, phrases, sentences, etc. that may represent a translation of the source language material. The list of candidate destination language words, phrases, sentences, etc. are referred to as translation hypotheses. After generating a list of hypotheses, the list may be subjected to further analysis by a language model 14. The language model 14 considers the context in which the hypotheses are used in the destination language $L_b$, and selects one of the hypotheses as the most likely translation of the source material.

The translation model 12 may be, for example, a phrase table with entries for each hypothesis. Each entry may include a source language word, phrase, sentence, etc. and a paired destination language word, phrase, sentence, etc. Each entry may be associated with a score that represents the likelihood, in general, that the destination language portion of the pair is the translation of the source language portion of the pair. For illustration purposes, an example of a phrase table is shown in Table 1, below.

TABLE 1

| Source Material | Destination Material | Score |
|---|---|---|
| Good | Gut | 0.7 |
| Good | Guten | 0.5 |
| Good | Gültig | 0.1 |

The source/destination pairs in the phrase table may be generated from bilingual training data 30. The bilingual training data 30 may include words, phrases, sentences, etc. that have been previously translated from the source language $L_a$ to the destination language $L_b$ (or vice versa). The score in the phrase table may represent a frequency at which the source/destination pairs were found to correspond to each other in the bilingual training data 40. A translation trainer 32 include logic to analyze the bilingual training data 30 and create or modify entries in the phrase table based on the analysis.

As noted above, the translation model 12 produced by the translation trainer 42 may be well-suited to generating an initial list of hypotheses indicative or possible translations for the source material. However, the translation model 12 typically does not take context into account. For example, Table 1 above shows that, in general, the word "Good" was translated into "Gut" slightly more often than it was translated into "Guten"; nonetheless, both are reasonably plausible hypotheses. Thus, without any context, it may be difficult to determine which translation is the most likely. However, assume that the previous word was translated as "Sehr" ("Very"). In German, it is much more likely that the word after "Sehr" should be translated as "Gut", rather than "Guten". In order to take this information into account, a language model 14 provides one or more tuning scores that allow the initial phrase table score to be supplemented or replaced in view of the words and phrases surrounding a particular candidate hypothesis. When presented with new information for translation, the translation system 10 may generate an initial list of hypotheses using the translation model 12, and then may select the most likely translation from among the list of hypotheses using the tuning scores provided by the language model 14.

TABLE 2

| Hypothesis under Consideration \| Previous Word/Phrase Analyzed | Probability |
|---|---|
| house \| the white | 0.8 |
| home \| the white | 0.01 |

The language model 14 used to translate a source language $L_a$ into a destination language $L_b$ is a language model 14 for the destination language $L_b$. The language model 14 may be trained using monolingual training data 24 for the destination language $L_b$. The monolingual training data 24 may be any suitable list of words, phrases, sentences, etc. from the destination language $L_b$. For example, the monolingual training data 24 may include publications, articles, or literature from the destination language $L_b$, and/or may include text collected from various sources (e.g., social networking posts, assuming that the author's privacy settings allow for the collection of such data). A language trainer 36 may include logic configured to analyze the monolingual training data 24 and to generate one or more tuning scores based on the occurrence of words, phrases, etc. based on their placement with respect to one another.

In some embodiments, a correction and repair module 38 employing correction logic may be provided. The correction and repair module 38 allows the user to correct the translation system 10 output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000.

User field customization logic may provide an interface for users to add new vocabulary to the system, and can also select an appropriate system vocabulary for their current situation. For example, a change in system vocabulary may be triggered by a change in location, as determined by the UPS coordinates indicating the current location of the user's device, or an explicit selection of task or location by the user.

The Correction and Repair Module 38 records and logs any corrections the user may make, which can be later used to update ASR logic 28 and translation system 10. If the correction contains a new vocabulary item, or if the user enters the field customization mode to explicitly add a new word to the system, or if a new word is automatically detected in the input audio using confidence measures or new word models, such as the method described in Thomas Schaaf, "Detection of OOV words using generalized word models and a semantic class language model", in Proc. of Eurospeech, 2001, the new vocabulary item or word may be added to the translation model 12 and/or the language model 14.

After applying the translation model 12 and/or the language model 14 to the input 36, the translation system 10 may generate an output 40 in the destination language $L_b$. The output 40 may be in a textual format and may be presented on a display device. In some embodiments, the output 40 may be automatically presented (e.g., an automatic translation or "autotransiation"). In other embodiments, a prompt may be presented and the user may request that the translation be shown. The translation may remain hidden until the user manually requests that the translation be presented.

If it is desirable to provide the output 40 in a format other than text, then logic may be employed for converting the output 40 into the desired format. For example, FIG. 2 depicts text-to-speech (TTS) logic 42 for converting the text generated by the translation system 10 into an audio recording. The TTS logic 42 generates audio output for an output device, such as a speaker. Examples of suitable TTS logic 42 include the Cepstral TTS module was used. Other TTS modules, such as TTS modules which support Windows SAPI (speech application programming interface) conventions, could also be employed.

Types of Supplemental Training Data

Figure 3:
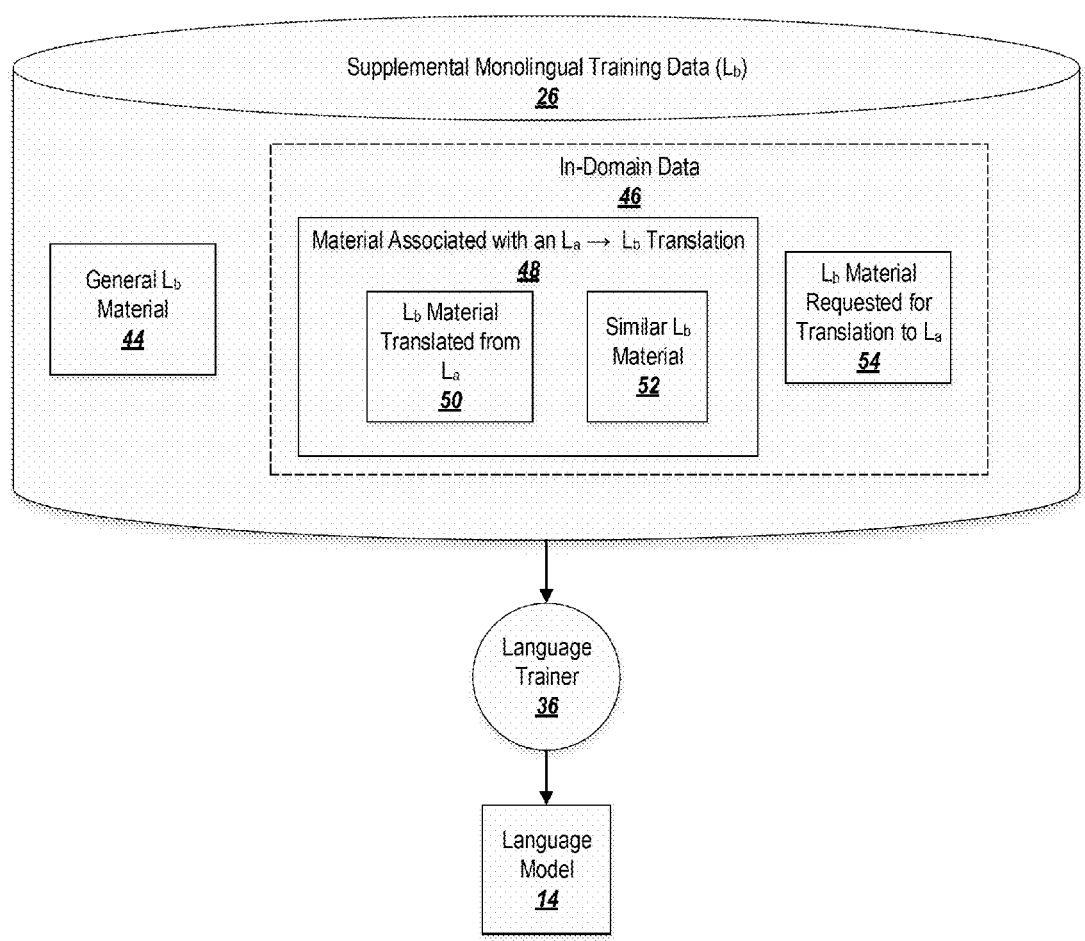
FIG. 3 is a block diagram depicting exemplary types of supplemental training data.

As noted above, in addition to the monolingual training data 24 used to train the language model 14, additional supplemental monolingual training data 26 may also be used to train the language model 14 specifically for topics that are likely to be relevant in a translation from a particular source language $L_a$. FIG. 3 depicts examples of supplemental monolingual training data 26.

The supplemental monolingual training data 26 may include general destination language $L_b$ material 44. This material 44 is similar to the primary monolingual training data 24 used to train the language model 14, in that there is no effort to select in-domain data for the general destination language material 44. Essentially, the material 44 is simply more of the material provided in the primary monolingual training data 24.

In order to assess the effect of simply adding more training data to the language model 14 (without regard to whether the data is in-domain), an experiment was run using social network data voluntarily offered by users. A baseline language model 14 was established using 100 million English-language words (this 100 million words serves as the general-purpose monolingual training data 24 in FIG. 1A). The baseline language model 14 was applied to translate new inputs 16 from Portuguese ($L_a$) into English ($L_b$). To evaluate the accuracy/quality of the machine-generated translations, the results were compared to human-generated translations and scored using the bilingual evaluation understudy (BLEU) score. The baseline language model achieved a BLEU score of 36.51.

The baseline language model 14 was then trained using 20M more words of random English-language ($L_b$) social network posts. Effectively, the language model 14 was trained with more of the same type of data on which it had been initially trained. Unsurprisingly, the resulting language model 14 performed about the same as the baseline language model 14 (BLEU score: 36.48).

Thus, simply providing supplemental general destination language ($L_b$) material 44 was found to have a diminishing effect on the quality of the translations produced.

More preferably, the supplemental monolingual training data 26 includes in-domain data 46. The in-domain data 46 includes data that addresses similar topics to those that are likely to occur in source material that is subject to a request for translation from the source language $L_a$ into the destination language $L_b$, or could simply include destination language $L_b$ material 52 that addresses similar topics to the translated material 50. Each type of material has benefits and weaknesses.

Material 50 translated into the destination language $L_b$ from the source language $L_a$ is likely to address highly relevant topics, since it is exactly the same type of material that is likely to be found in future $L_a \rightarrow L_b$ translation requests. This could include human-generated translations and/or machine-generated translations. The human-generated translations are likely to be of high quality (e.g., grammatically correct), but will be few in number and expensive to produce. Machine-generated translations may be easier to acquire, but are less likely to be grammatically correct.

Likewise, material 52 that is similar to the translated material 50 may be readily available, but acquiring such material 52 requires that previously translated material 50 be identified and analyzed to determine which topics were discussed, and then material covering similar topics must be found in the destination language $L_b$.

The above-described test was run using previously-translated material 50 (specifically, 11 million words' worth of machine translations from Portuguese to English), and similar material 52 (specifically, 20 million English words' worth of social network posts having topics similar to those discussed in the translated material 50). The resulting BLEU scores were 36.70 and 36.55, respectively. This shows a modest improvement over the baseline score of 36.51 when in-domain data is used).

A further example of in-domain data includes destination language ($L_b$) material 54 that has previously been the subject of a request for translation into the source language ($L_a$). This represents material that has been subjected to a request for a translation in the reverse direction as the one for which the language model 14 is being trained. Using the above example of a language model 14 being trained to translate Portuguese into English, the material 54 that was the subject of a reverse translation request would include English words that were translated into Portuguese.

Using the reverse translation requests has the benefit that the words, phrases, sentences, etc. on which the language model 14 is being trained were originally source language materials, likely written by native speakers. They are thus likely to be grammatically correct and represent real-world user preferences. At the same time, this material 54 (translated from $L_b \rightarrow L_a$) is likely to cover many similar topics as compared to the material for which the language model is being trained (i.e., $L_a \rightarrow L_b$ translations), under the assumption that people who request translations from a first language to a second language probably discuss similar topics as people who request translations from the second language back into the first language. Using the above example, people who request translations from English to Portuguese probably talk about many of the same topics as people who request translations from Portuguese to English.

Once again, the above-described experiment was run using 20 million words' worth of social network posts in English that had previously been requested for translation to Portuguese ($L_b \rightarrow L_a$). The resulting BLEU score was 36.84, which provided the most improvement over the baseline score of 36.51.

A summary of results from the above-described experiments is provided in Table 3:

TABLE 3

| System | Translation Score (BLEU) |
|---|---|
| (1) Baseline Translation System with General-Purpose Language Model ($L_b$) | 36.51 |
| (2) Language Model Trained with Supplemental $L_b$ Language Social Network Posts | 36.48 |
| (3) Language Model Trained with Supplemental $L_b$ words from $L_a \rightarrow L_b$ Machine Translations | 36.70 |
| (4) Language Model Trained with Supplemental $L_b$ Social Network Posts Having Topics Similar to those Found in (3) | 36.55 |
| (5) Language Model Trained with Supplemental $L_b$ Social Network Posts Associated with Requests for Translation into $L_a$ ($L_b \rightarrow L_a$) | 36.84 |

As can be seen above, the in-domain data that was the subject of a previous reverse translation (System (5) above) showed the greatest improvements; however, modest improvements were also seen for the in-domain data of Systems (3) and (4). Accordingly, exemplary embodiments utilize supplemental training data that represents in-domain materials, such as those described above in connection with Systems (3), (4), and (5). Exemplary techniques for training a language model 14 using this supplemental data are next described in connection with FIGS. 4A-4B.

Model Training and Updating

Figure 4A:
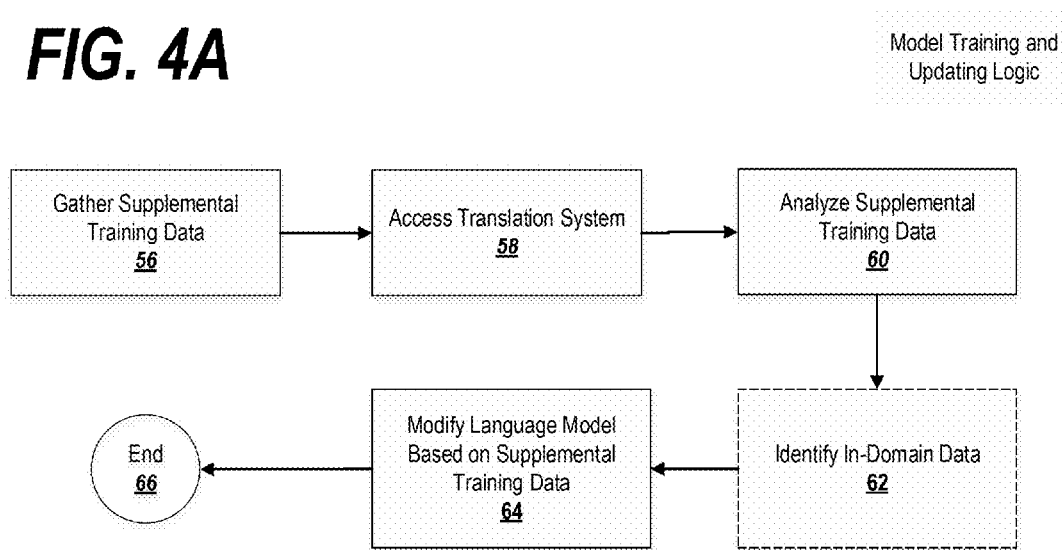
FIGS. 4A-4B are flowcharts describing an exemplary process for training a language model using in-domain supplemental training data.
Figure 4B:
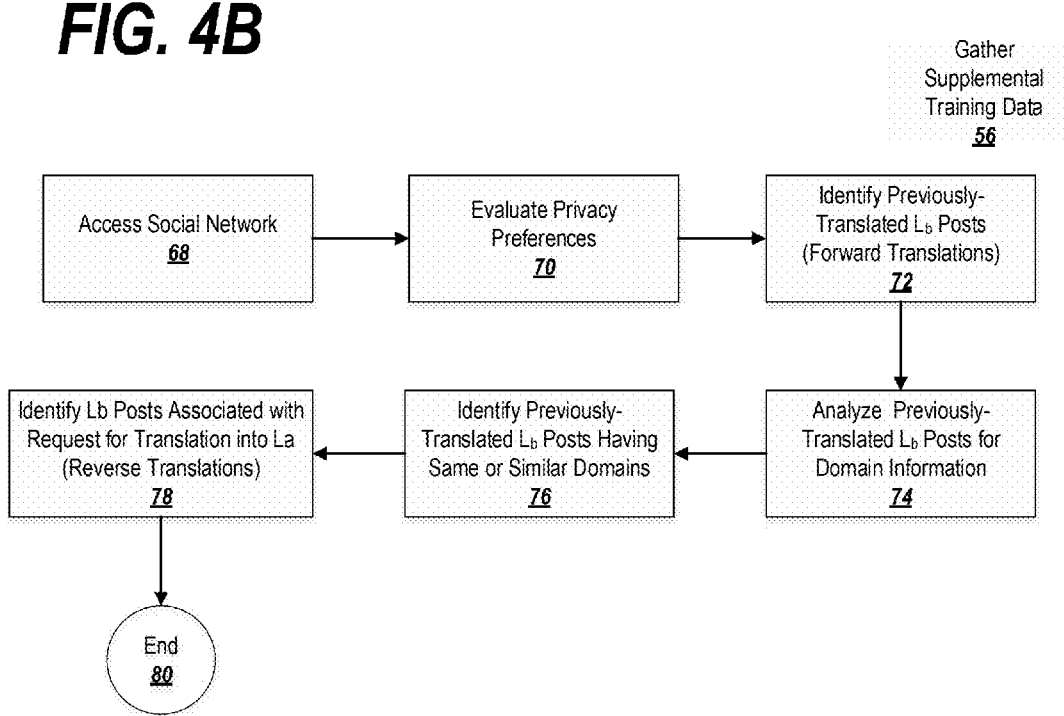

FIGS. 4A-4B depict an exemplary process for improving translation models based on supplemental in-domain training data. The procedures depicted in FIGS. 4A-4B may be applied as model training and updating logic including computer-executable instructions. The instructions may be executed by one or more trainers, such as the language trainer 36. The embodiments depicted in FIGS. 4A and 4B are used to train a language model for translating material from a source language $L_a$ into a destination language $L_b$.

FIG. 4A depicts a model training and updating procedure that may be embodied as model training and updating logic. The procedure begins at step 56, where supplemental training data may be gathered. The supplemental training data may include any in-domain materials suitable for use in training a language model 14 to perform translations from a source language $L_a$ into a destination language $L_b$. Among other possibilities, the supplemental training data may include data voluntarily provided by users of a social network (e.g., social networks posts, articles, comments, etc.), as described in more detail in connection with FIG. 4B.

At step 58, the translation system 10 may be accessed. A trained language model 14 corresponding to the destination language $L_b$ may be identified in the translation system 10. The trained translation model 14 may include or may reference one or more scores, parameters, probabilities, weights, etc. For example, the trained translation model may reference a table of probabilities, such as the table shown above in Table 3.

At step 60, the system may analyze the supplemental training data acquired at step 56. For example, the language trainer 36 may analyze the supplemental training data in the same manner as the language trainer 36 analyzed the original monolingual training data 24 used to originally train the language model 14. The language trainer 36 may examine groups of words (e.g., n-grams), phrases, etc. to determine a likelihood that different words, phrases etc. will appear together or in a particular order. The size of the groups may be varied within a training session and/or between training sessions (e.g., the language trainer 36 may first consider 2-word groups, then 3-word groups, etc.) depending on the application.

At step 62, the system may optionally identify in-domain data in the supplemental training data for further analysis. In some embodiments, the supplemental training data may contain or may consist of general training data in the destination language (i.e., data that is collected without regard to whether it is in-domain or not). As noted above, such data may not significantly improve the language model 14. Accordingly, the supplemental training data may be analyzed at step 62 to evaluate which of the supplemental training data is in-domain data and which is not in-domain data. For example, the general supplemental data may be compared to any data that has been identified as in-domain (e.g., the materials 50, 52, and 54) to identify similar patterns, keywords, etc. in the general supplemental data. Any of the general supplemental data that is in-domain data may be retrieved and analyzed at step 62.

At step 64, the language model may be modified based on the analysis of the supplemental training data. For example, one or more weights, scores, probabilities, parameters, etc. applied by the language model 14 in selecting between hypotheses may be modified to make the selection of a particular hypothesis more or less likely, depending on the frequency of occurrences of the hypothesis in connection with surrounding materials in the supplemental training data. Processing may then proceed to step 66 and terminate.

The modified language model 14 may represent a special purpose language model that is customized to scoring destination language $L_b$ hypotheses that were generated from a particular source language $L_a$. When the translation system 10 receives a source language input for translation into a destination language, the translation system 10 may determine whether a special-purpose language model 14 exists for this particular translation combination and direction ($L_a \rightarrow L_b$). If so, the special-purpose language model 14 may be applied. If not, then the translation system may determine whether a general-purpose language model 14 exists for the destination language ($L_b$). Alternatively or in addition, some special-purpose language models 14 may be marked as being related to each other. For example, special purpose language models for translating related source languages into a common destination language ($L_{a1} \rightarrow L_b$, $L_{a2} \rightarrow L_b$, etc.). Related source languages may be languages that are flagged as sharing cultural similarities or otherwise would be likely to reference similar domains or topics (e.g., Catalonian and Spanish, Mandarin and Cantonese, etc.). If a special-purpose language model 14 is not available for a specific source language (e.g., an $L_a \rightarrow L_b$ language model), then the translations system 10 may apply a special purpose language model 14 associated with a related source language (e.g., an $L_{a1} \rightarrow L_b$ language model).

As noted above, the supplemental training data may originate in a social network. FIG. 4B depicts an example of collecting supplemental training data from a social network.

The process begins at step 68, when the social network is accessed. For example, the translation system 10 may authenticate to an authentication server that is associated with or a part of a social networking service.

The translation system 10 may retrieve a list of users that have opted into data collection for research purposes from the social networking service. At step 70, the translation system 10 may evaluate these users' privacy preferences to ensure that the user has specifically agreed to have data collected for the purposes to which the translation system 10 is collecting the data.

Assuming the users have authorized the data collection, at step 72 the translation system 10 may identify destination language ($L_b$) materials, such as user posts or comments, which have were translated from the source language $L_a$ into the destination language $L_b$. These posts may represent supplemental data of the form of the materials 50 from FIG. 3. For example, the social networking service may keep track of translation requests on behalf of the translation system 10, and may provide a list of forward translation requests to the translation system at step 72. The list may include an identification of the direction of the translation (e.g., $L_a \rightarrow L_b$). The translation system may retrieve corresponding materials based on the list.

At step 74, the translation system 10 may analyze the materials retrieved at step 74 to determine which topics or domains were the subject of discussion in these materials. For example, the translation system 10 may perform keyword analyses, identify commonly-used terms or proper nouns, etc. Based on this analysis, at step 76 the translation system 10 may search among the users identified at steps 68 and 70 for materials (posts, comments, etc.) addressing similar domains or topics. This material may be used as supplemental data of the type 52 described in connection with FIG. 3.

At step 78, the translation system may identify destination language $L_b$ materials (e.g., posts, comments, etc.) that were originally written in the destination language $L_b$, but were the subject of a translation request into the source language $L_a$. For example, the translation system may consult the list described above in connection with step 72 to identify translations from $L_b \rightarrow L_a$ and may retrieve the corresponding $L_b$ materials.

Processing may then proceed to step 80 and terminate (in the context of the above example in FIG. 4A, processing returns to step 58 and continues).

Although FIGS. 4A-4B depict exemplary steps, it is noted that not all steps are necessary, and other steps may be substituted or added. For example, in connection with FIG. 4B, the translation system may seek only reverse translations (step 78), while refraining from performing steps 72 and 74.

Next, an exemplary system for generating and applying further refined custom language models is described.

Generating and Applying Custom Language Models

In addition to customizing language models for particular domains or topics ordinarily addressed in a given source language/destination language ($L_a/L_b$) pair, the language models may be further refined by taking demographic information of the translation requestor into account. For example, males between the ages of 55 and 70 may apply different grammar, word-choice, or other language preferences as compared to females between the ages of 12 and 18.

Figure 5:
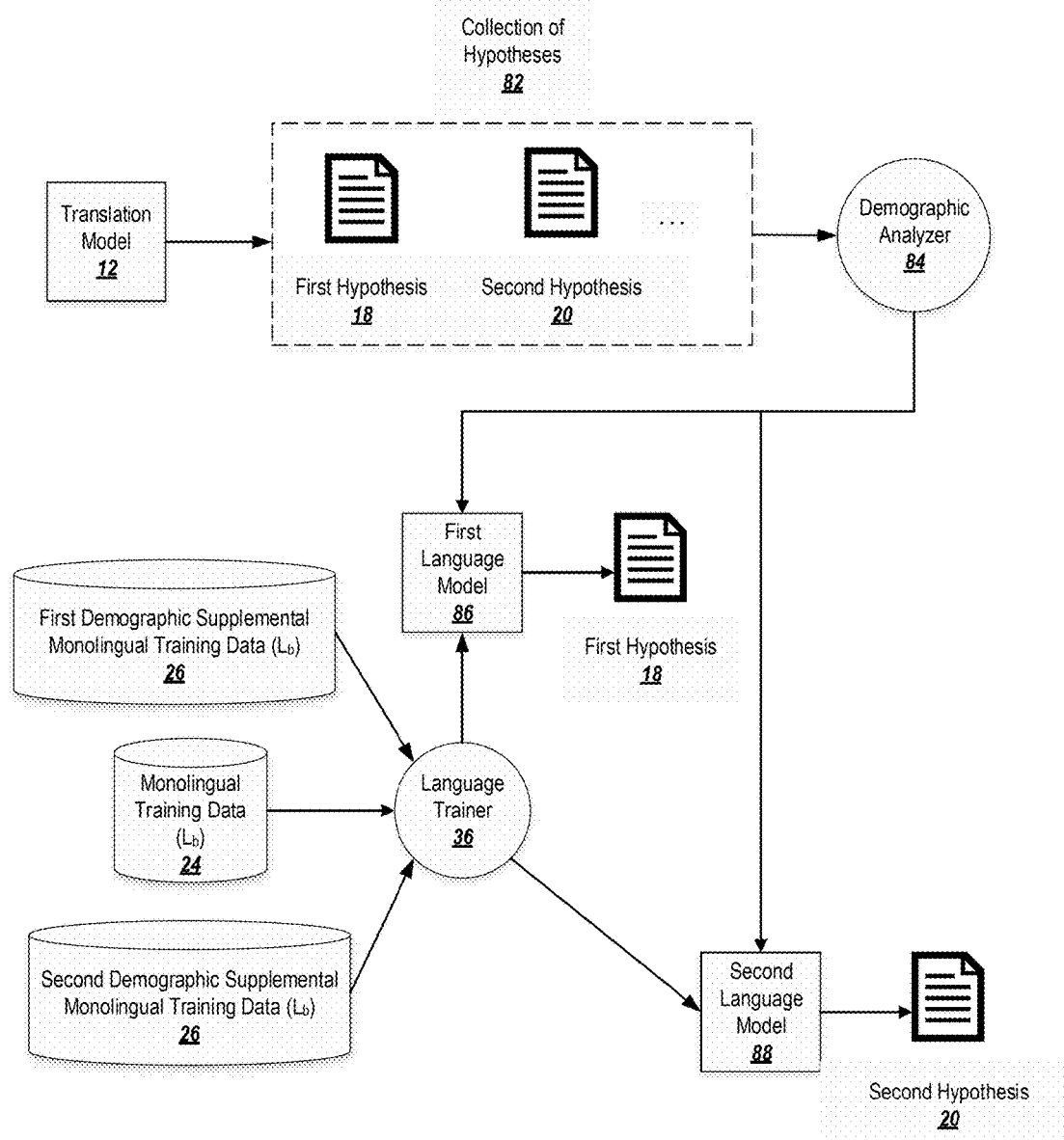
FIG. 5 is a block diagram depicting an exemplary system for applying custom language models for different demographics.

In order to account for these demographic preferences, as shown in FIG. 5 the language trainer 36 may apply the monolingual training data 24 to generate a general language model. The base language model 14 may be further refined by training the language model with first demographic supplemental monolingual training data 26 in the destination language ($L_b$), where the first demographic supplemental monolingual training data 26 is made up of data that is in-domain for a particular demographic group, or contains topics regularly discussed by the first demographic group. Such data may be identified in a manner similar to the one described in connection with FIGS. 4A-4B. The result is a first language model 86 that fits the language preferences of the first demographic group.

Another copy of the base language model 14 may be further refined using second demographic supplemental monolingual training data 26 in the destination language ($L_b$). The second demographic supplemental monolingual training data 26 may correspond to domains or topics regularly discussed by the second demographic group. The result is a second language model 88 customized to the language preferences of the second demographic group. Of course, more demographic groups than two may be accommodated, depending on the application.

In application, the translation system 10 may receive an input 16, which may be provided to the translation model 12. The translation model 12 may generate a collection of hypotheses 82, including (in this example) a first hypothesis 18 and a second hypothesis 20. The collection of hypotheses 82 may be provided to a demographic analyzer 84, which receives information about the demographics of the person who submitted the original translation request. For example, a social network may package demographic information with the translation request, or the translation system 10 may query the social network or the user for demographic information, or the user's demographics may be derived from other sources.

Based on the demographic information analyzed by the demographic analyzer 84, the demographic analyzer may select one of the language models corresponding to the identified demographics (e.g., a language model trained using the demographic supplemental monolingual training data 26 corresponding to the demographic group of the user submitting the translation request). The demographic analyzer 84 may provide the collection of hypotheses 82 to the selected language model, and the selected language model may output a most-likely hypothesis to be used in the translation.

Depending on the language model, different language models may generate different output translations. For example, in FIG. 5, submitting the collection of hypotheses 82 to the first language model 86 causes the first hypothesis 18 to be selected for the translation. On the other hand, submitting the collection of hypotheses to the second language model 88 causes the second hypothesis 20 to be selected for the translation.

Accordingly, the language patterns of different demographic groups can be accommodated using different language models corresponding to the different demographic groups.

Network Embodiments

Figure 6:
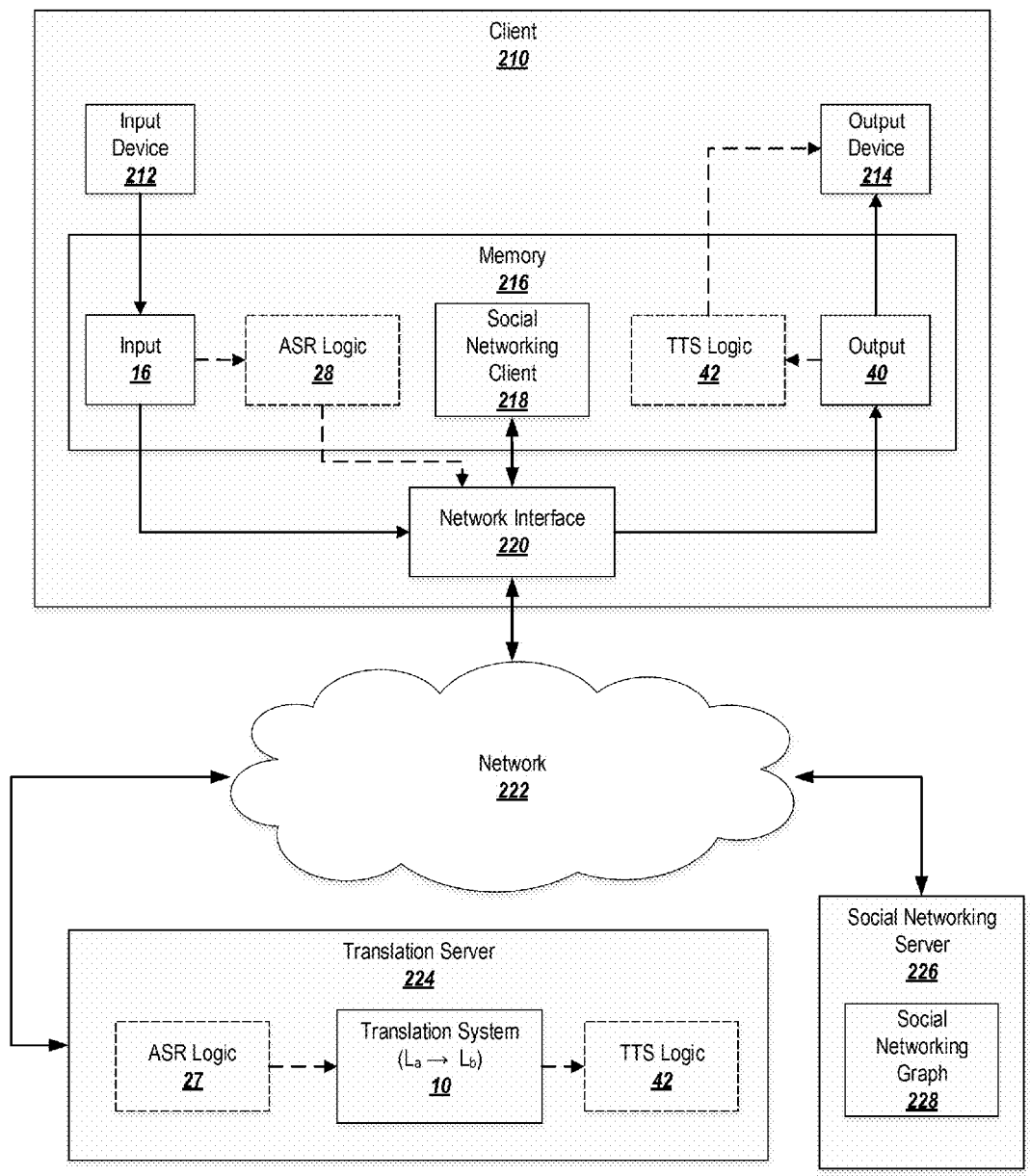
FIG. 6 depicts an exemplary network embodiment.

Some exemplary embodiments may be employed in a network environment, such as the environment depicted in FIG. 6.

A user may interact with a client 210, which may be (for example) a personal computer, tablet, mobile phone, special-purpose translation device, etc. In some embodiments, the client 210 does not require interaction from a user.

The client 210 may include one or more input devices 212 and one or more output devices 214. The input devices 212 may include, for example, microphones, keyboards, cameras, electronic pens, touch screens, and other devices for receiving an input in a source language $L_a$. The output devices 214 may include a speaker, a display device such as a monitor or touch screen, and other devices for presenting an output in a destination language $L_b$.

In some embodiments, the input from the input devices 212 may be in the form of an input 16 that is being sent to a translation system 10 for translation. In other embodiments, the client 210 may also submit training data, a phrase table, a translation, or a translation and the original source data used to generate the translation.

The client 210 may include a memory 216, which may be a non-transitory computer readable storage medium, such as one or a combination of a hard drive, solid state drive, flash storage, read only memory, or random access memory. The memory 216 may a representation of an input 36 and/or a representation of an output 40, as well as one or more applications. For example, the memory 216 may store a social networking client 218 that allows a user to interact with a social networking service.

The input 16 may be textual, such as in the case where the input device 212 is a keyboard. Alternatively, the input 16 may be an audio recording, such as in the case where the input device 212 is a microphone. Accordingly, the input 16 may be subjected to automatic speech recognition (ASR) logic 28 in order to transform the audio recording to text that is processable by the translation system 10. As shown in FIG. 6, the ASR logic 28 may be located at the client device 210 (so that the audio recording is processed locally by the client 210 and corresponding text is transmitted to the translation server 224), or may be located remotely at the translation server 224 (in which case, the audio recording may be transmitted to the translation server 224 and the translation server 224 may process the audio into text). Other combinations are also possible—for example, if the input device 212 is a touch pad or electronic pen, the input 36 may be in the form of handwriting, which may be subjected to handwriting or optical character recognition analysis logic in order to transform the input 36 into processable text.

Similarly, a resulting output 40 from a translation system 10 may be in the form of text. In some embodiments, the desirable end form of the output may be something other than text, such as an audio representation of the translation. Accordingly, the output 40 may be subjected to text-to-speech (TTS) logic 42 in order to transform the text into an audio recording that is presentable by the output devices 214. As shown in FIG. 6, the TTS logic 42 may be located at the client device 210 (so that the output text is processed locally by the client 210 and corresponding audio is sent to the output devices 214), or may be located remotely at the translation server 224 (in which case, text may be processed at the translation server 224 and the resulting audio recording may be transmitted to the client 210). Other combinations of processing logic are also possible, depending on the desired final form for the output 40.

The client 210 may be provided with a network interface 220 for communicating with a network 222, such as the Internet. The network interface 220 may transmit the input 10 in a format and/or using a protocol compatible with the network 222 and may receive a corresponding output 28 from the network 222.

The network interface 220 may communicate through the network 222 to a translation server 224. The translation server 224 may host the above-described translation system 10. The translation system 10 may translate the input 36 into an output 50.

The network interface 220 of the client 210 may also be used to communicate through the network 222 with a social networking server 226. The social networking server 226 may include or may interact with a social networking graph 228 that defines connections in a social network. Furthermore, the translation server 224 may connect to the social networking server 226 for various purposes, such as retrieving training data from the social network.

A user of the client 210 may be an individual (human user), an entity (e.g., an enterprise, business, or third-party application), or a group (e.g., of individuals or entities) that interacts or communicates with or over the social-networking server 226. The social-networking server 226 may be a network-addressable computing system hosting an online social network. The social-networking server 226 may generate, store, receive, and send social-networking data, such as, for example, user-profile data, concept-profile data, social-graph information, or other suitable data related to the online social network. The social-networking server 226 may be accessed by the other components of the network environment either directly or via the network 222.

The social-networking server 226 may include an authorization server (or other suitable component(s)) that allows users to opt in to or opt out of having their actions logged by social-networking server 226 or shared with other systems (e.g., third-party systems, such as the translation server 224), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 226 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 100 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 226 may send a request to the data store for the object. The request may identify the user associated with the request. The requested data object may only be sent to the user (or a client system 210 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 226 or explicit connections of a user to a node, object, entity, brand, or page on social-networking server 226. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
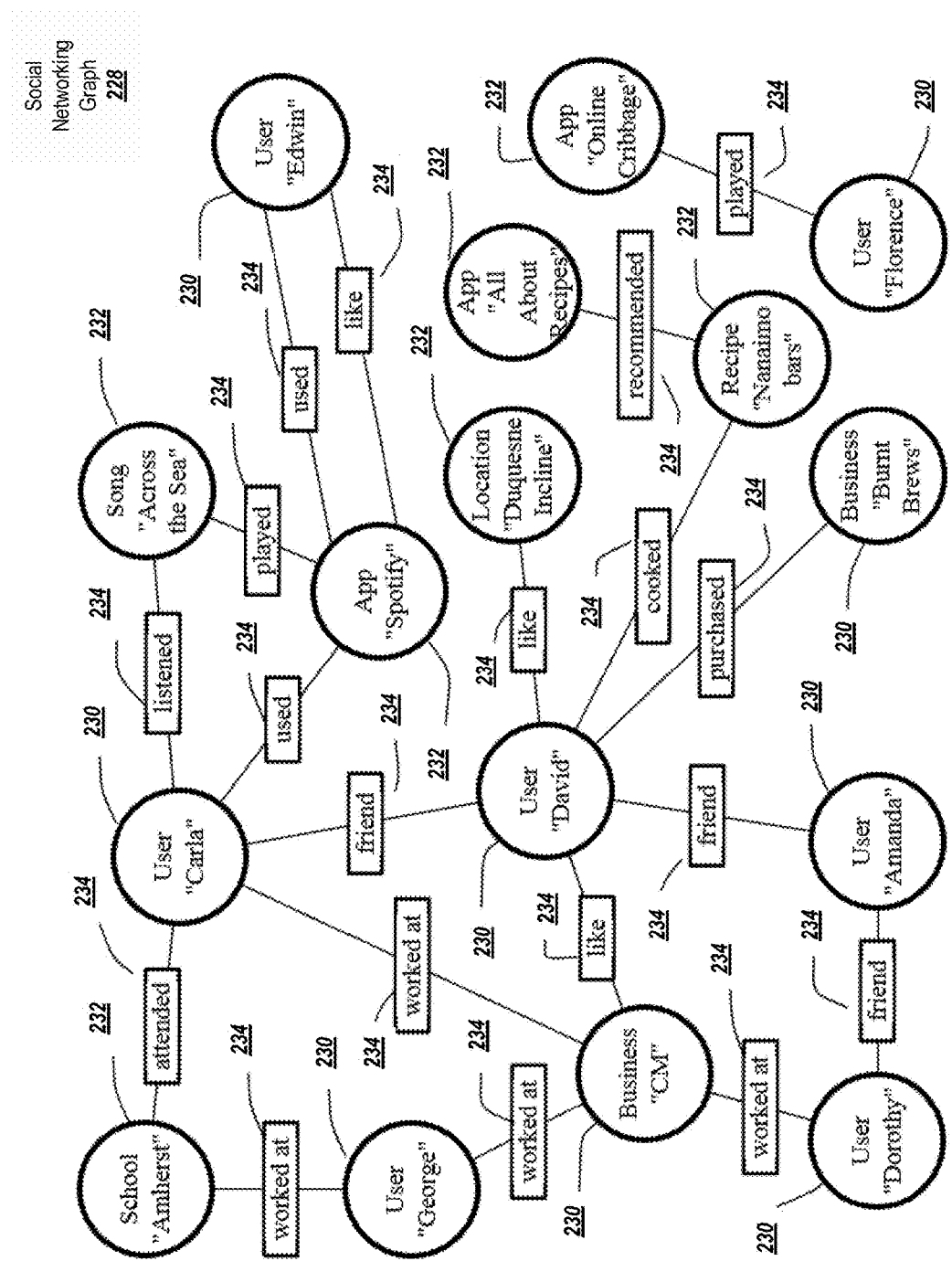
FIG. 7 describes the social networking graph depicted in FIG. 6 in more detail.

FIG. 7 illustrates an example of a social graph 228. In exemplary embodiments, a social-networking service may store one or more social graphs 228 in one or more data stores as a social graph data structure via the social networking service.

The social graph 228 may include multiple nodes, such as user nodes 230 and concept nodes 232. The social graph 228 may furthermore include edges 234 connecting the nodes. The nodes and edges of social graph 228 may be stored as data objects, for example, in a data store (such as a social-graph database). Such a data store may include one or more searchable or queryable indexes of nodes or edges of social graph 228.

The social graph 228 may be accessed by a social-networking server 226, client system 210, third-party system (e.g., the translation server 224), or any other approved system or device for suitable applications.

A user node 230 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 230 corresponding to the user, and store the user node 30 in one or more data stores. Users and user nodes 230 described herein may, where appropriate, refer to registered users and user nodes 230 associated with registered users. In addition or as an alternative, users and user nodes 230 described herein may, where appropriate, refer to users that have not registered with the social-networking system. In particular embodiments, a user node 230 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 230 may be associated with one or more data objects corresponding to information associated with a user. In particular embodiments, a user node 230 may correspond to one or more webpages. A user node 230 may be associated with a unique user identifier for the user in the social-networking system.

In particular embodiments, a concept node 232 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 232 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 232 may be associated with one or more data objects corresponding to information associated with concept node 232. In particular embodiments, a concept node 232 may correspond to one or more webpages.

In particular embodiments, a node in social graph 228 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 232. Profile pages may be viewable by all or a selected subset of other users. As an example and not by way of limitation, a user node 230 may have a corresponding user-profile page in which the corresponding user may add content, make declarations, or otherwise express himself or herself. A business page such as business page 205 may comprise a user-profile page for a commerce entity. As another example and not by way of limitation, a concept node 232 may have a corresponding concept-profile page in which one or more users may add content, make declarations, or express themselves, particularly in relation to the concept corresponding to concept node 232.

In particular embodiments, a concept node 232 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like", "check in", "eat", "recommend", or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 230 corresponding to the user and a concept node 232 corresponding to the third-party webpage or resource and store edge 234 in one or more data stores.

In particular embodiments, a pair of nodes in social graph 228 may be connected to each other by one or more edges 234. An edge 234 connecting a pair of nodes may represent a relationship between the pair of nodes. In particular embodiments, an edge 234 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request", the social-networking system may create an edge 234 connecting the first user's user node 230 to the second user's user node 230 in social graph 228 and store edge 234 as social-graph information in one or more data stores. In the example of FIG. 7, social graph 228 includes an edge 234 indicating a friend relation between user nodes 230 of user "Amanda" and user "Dorothy". Although this disclosure describes or illustrates particular edges 234 with particular attributes connecting particular user nodes 230, this disclosure contemplates any suitable edges 234 with any suitable attributes connecting user nodes 230. As an example and not by way of limitation, an edge 234 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 228 by one or more edges 234.

In particular embodiments, an edge 234 between a user node 230 and a concept node 232 may represent a particular action or activity performed by a user associated with user node 230 toward a concept associated with a concept node 232. As an example and not by way of limitation, as illustrated in FIG. 7, a user may "like", "attended", "played", "listened", "cooked", "worked at", or "watched" a concept, each of which may correspond to a edge type or subtype. A concept-profile page corresponding to a concept node 232 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 234 and a "used" edge (as illustrated in FIG. 7) between user nodes 230 corresponding to the user and concept nodes 232 corresponding to the song and application to indicate that the user listened to the song and used the application. Moreover, the social-networking system may create a "played" edge 234 (as illustrated in FIG. 7) between concept nodes 232 corresponding to the song and the application to indicate that the particular song was played by the particular application. In this case, "played" edge 234 corresponds to an action performed by an external application (SPOTIFY) on an external audio file (the song "Across the Sea"). Although this disclosure describes particular edges 234 with particular attributes connecting user nodes 230 and concept nodes 232, this disclosure contemplates any suitable edges 234 with any suitable attributes connecting user nodes 230 and concept nodes 232. Moreover, although this disclosure describes edges between a user node 230 and a concept node 232 representing a single relationship, this disclosure contemplates edges between a user node 230 and a concept node 232 representing one or more relationships. As an example and not by way of limitation, an edge 234 may represent both that a user likes and has used at a particular concept. Alternatively, another edge 234 may represent each type of relationship (or multiples of a single relationship) between a user node 230 and a concept node 232 (as illustrated in FIG. 7 between user node 230 for user "Edwin" and concept node 232 for "SPOTIFY").

In particular embodiments, the social-networking system may create an edge 234 between a user node 230 and a concept node 232 in social graph 228. As an example and not by way of limitation, a user viewing a concept-profile page (such as, for example, by using a web browser or a special-purpose application hosted by the user's client system) may indicate that he or she likes the concept represented by the concept node 232 by clicking or selecting a "Like" icon, which may cause the user's client system to send to the social-networking system a message indicating the user's liking of the concept associated with the concept-profile page. In response to the message, the social-networking system may create an edge 234 between user node 230 associated with the user and concept node 232, as illustrated by "like" edge 234 between the user and concept node 232. In particular embodiments, the social-networking system may store an edge 234 in one or more data stores. In particular embodiments, an edge 234 may be automatically formed by the social-networking system in response to a particular user action. As an example and not by way of limitation, if a first user uploads a picture, watches a movie, or listens to a song, an edge 234 may be formed between user node 230 corresponding to the first user and concept nodes 232 corresponding to those concepts. Although this disclosure describes forming particular edges 234 in particular manners, this disclosure contemplates forming any suitable edges 234 in any suitable manner.

The social graph 228 may further comprise a plurality of product nodes. Product nodes may represent particular products that may be associated with a particular business. A business may provide a product catalog to a consumer-to-business service and the consumer-to-business service may therefore represent each of the products within the product in the social graph 228 with each product being in a distinct product node. A product node may comprise information relating to the product, such as pricing information, descriptive information, manufacturer information, availability information, and other relevant information. For example, each of the items on a menu for a restaurant may be represented within the social graph 228 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 228. The information for a product node may be manipulated by the social-networking system as a product object that encapsulates information regarding the referenced product.

As such, the social graph 228 may be used to infer shared interests, shared experiences, or other shared or common attributes of two or more users of a social-networking system. For instance, two or more users each having an edge to a common business, product, media item, institution, or other entity represented in the social graph 228 may indicate a shared relationship with that entity, which may be used to suggest customization of a use of a social-networking system, including a messaging system, for one or more users.

Computer-Related Embodiments

Figure 8:
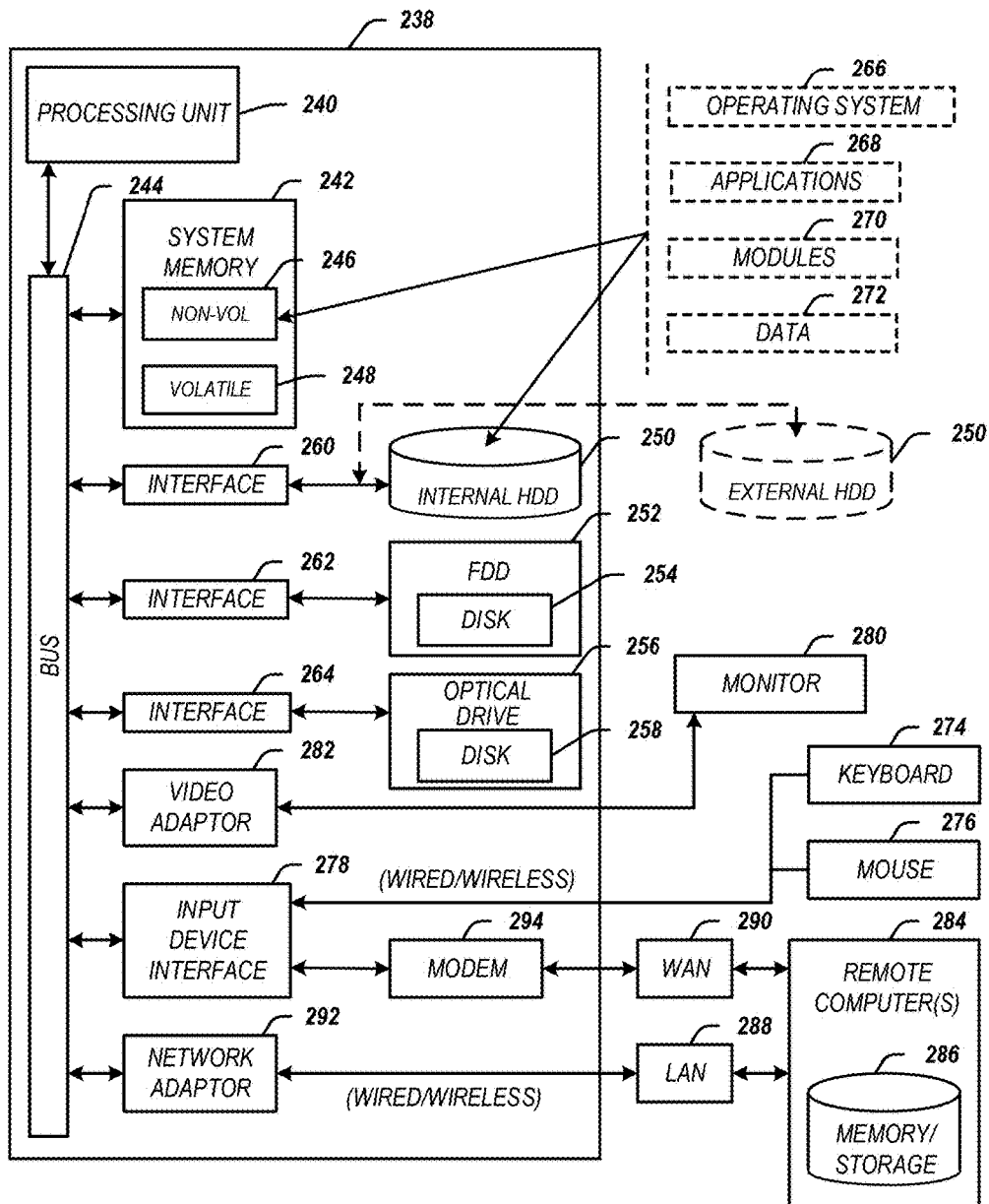
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 236 suitable for implementing various embodiments as previously described. In one embodiment, the computing architecture 236 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 236. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 236 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 236.

As shown in FIG. 8, the computing architecture 236 comprises a processing unit 240, a system memory 242 and a system bus 244. The processing unit 240 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 240.

The system bus 244 provides an interface for system components including, but not limited to, the system memory 242 to the processing unit 240. The system bus 244 can be any of several types of bus structure that may further interconnect to a memory bus (with or without a memory controller), a peripheral bus, and a local bus using any of a variety of commercially available bus architectures. Interface adapters may connect to the system bus 244 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 236 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 242 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 242 can include non-volatile memory 246 and/or volatile memory 248. A basic input/output system (BIOS) can be stored in the non-volatile memory 246.

The computer 238 may include various types of computer-readable storage media in the form of one or more lower speed memory units, including an internal (or external) hard disk drive (HDD) 250, a magnetic floppy disk drive (FDD) 252 to read from or write to a removable magnetic disk 254, and an optical disk drive 256 to read from or write to a removable optical disk 258 (e.g., a CD-ROM or DVD). The HDD 250, FDD 252 and optical disk drive 256 can be connected to the system bus 244 by a HDD interface 260, an FDD interface 262 and an optical drive interface 264, respectively. The HDD interface 260 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 246, 248, including an operating system 266, one or more application programs 268, other program modules 270, and program data 272. In one embodiment, the one or more application programs 268, other program modules 270, and program data 272 can include, for example, the various applications and/or components of the system 30.

A user can enter commands and information into the computer 238 through one or more wire/wireless input devices, for example, a keyboard 274 and a pointing device, such as a mouse 276. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 278 that is coupled to the system bus 244, but can be connected by other interfaces such as a parallel port, IEEE 694 serial port, a game port, a USB port, an IR interface, and so forth.

A monitor 280 or other type of display device is also connected to the system bus 244 via an interface, such as a video adaptor 282. The monitor 280 may be internal or external to the computer 238. In addition to the monitor 280, a computer typically includes other peripheral output devices, such as speakers, printers, and so forth.

The computer 238 may operate in a networked environment using logical connections via wire and/or wireless communications to one or more remote computers, such as a remote computer 284. The remote computer 284 can be a workstation, a server computer, a router, a personal computer, portable computer, microprocessor-based entertainment appliance, a peer device or other common network node, and typically includes many or all of the elements described relative to the computer 238, although, for purposes of brevity, only a memory/storage device 286 is illustrated. The logical connections depicted include wire/wireless connectivity to a local area network (LAN) 288 and/or larger networks, for example, a wide area network (WAN) 290. Such LAN and WAN networking environments are commonplace in offices and companies, and facilitate enterprise-wide computer networks, such as intranets, all of which may connect to a global communications network, for example, the Internet.

When used in a LAN networking environment, the computer 238 is connected to the LAN 288 through a wire and/or wireless communication network interface or adaptor 292.

The adaptor 292 can facilitate wire and/or wireless communications to the LAN 288, which may also include a wireless access point disposed thereon for communicating with the wireless functionality of the adaptor 292.

When used in a WAN networking environment, the computer 238 can include a modem 294, or is connected to a communications server on the WAN 290, or has other means for establishing communications over the WAN 290, such as by way of the Internet. The modem 294, which can be internal or external and a wire and/or wireless device, connects to the system bus 244 via the input device interface 278. In a networked environment, program modules depicted relative to the computer 238, or portions thereof, can be stored in the remote memory/storage device 286. It will be appreciated that the network connections shown are exemplary and other means of establishing a communications link between the computers can be used.

The computer 238 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein", respectively. Moreover, the terms "first", "second", "third", and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   accessing a translation system, the translation system configured to generate a machine translation of source material from a source language into a destination language, the translation system being trained using destination language training data and comprising:
a translation model configured to receive the source material and generating one or more destination language hypotheses for the source material, and
a language model configured to select one of the destination language hypotheses based on an analysis of the destination language training data;
analyzing supplemental destination language training data for training the language model, the supplemental destination language training data comprising one or more of:
monolingual destination language material that has been previously machine translated from the source language, or
destination language material for which translation into the source language has been previously requested; and
based on the analyzing, modifying the language model to account for the supplemental destination language training data.

2. The method of claim 1, wherein the supplemental destination language training data comprises posts from a social network.

3. The method of claim 1 wherein the translation model is configured to be trained using bilingual training data comprising material in the source language and material in the destination language, and the language model is configured to be trained using monolingual training data consisting of material in the destination language.

4. The method of claim 1, wherein the supplemental destination language training data contains training material in one or more domains associated with the source language.

5. The method of claim 1, wherein the supplemental destination language training data comprises
untranslated destination language material that includes topics similar to topics found in translated destination language material.

6. The method of claim 1, wherein:
the translation system applies a model selected from a plurality of models for translating the source material into the destination material;
the plurality of models comprise:
a first language model targeted to a first demographic group, and
a second language model targeted to a second demographic group; and
further comprising:
analyzing demographic information of an originator of a request to translate the source material into the destination language;
selecting the first language model or the second language model based on the demographic information; and
applying the selected language model to translate the source material.

7. A non-transitory computer-readable medium storing instructions that, when executed by one or more processors, cause the one or more processors to:
access a translation system, the translation system configured to generate a machine translation of source material from a source language into a destination language, the translation system being trained using destination language training data and comprising:
a translation model configured to receive the source material and generating one or more destination language hypotheses for the source material, and
a language model configured to select one of the destination language hypotheses based on an analysis of the destination language training data;
analyze supplemental destination language training data for training the language model, the supplemental destination language training data comprising one or more of:
monolingual destination language material that has been previously machine translated from the source language, or
destination language material for which translation into the source language has been previously requested; and
based on the analyzing, modify the language model to account for the supplemental destination language training data.

8. The medium of claim 7, wherein the supplemental destination language training data comprises posts from a social network.

9. The medium of claim 7, wherein the translation model is configured to be trained using bilingual training data comprising material in the source language and material in the destination language, and the language model is configured to be trained using monolingual training data consisting of material in the destination language.

10. The medium of claim 7, wherein the supplemental destination language training data contains training material in one or more domains associated with the source language.

11. The medium of claim 7, wherein the supplemental destination language training data comprises
untranslated destination language material that includes topics similar to topics found in translated destination language material.

12. The medium of claim 7, wherein:
the translation system applies a model selected from a plurality of models for translating the source material into the destination material;
the plurality of models comprise:
a first language model targeted to a first demographic group, and
a second language model targeted to a second demographic group; and
further storing instructions for:
analyzing demographic information of an originator of a request to translate the source material into the destination language;
selecting the first language model or the second language model based on the demographic information; and
applying the selected language model to translate the source material.

13. An apparatus comprising:
a non-transitory computer-readable medium configured to store logic for implementing a translation system, the translation system configured to generate a machine translation of source material from a source language into a destination language, the translation system being trained using destination language training data and comprising:
a translation model configured to receive the source material and generating one or more destination language hypotheses for the source material, and
a language model configured to select one of the destination language hypotheses based on an analysis of the destination language training data;
a processor configured to:

analyze supplemental destination language training data for training the language model, the supplemental destination language training data comprising one or more of:
- monolingual destination language material that has been previously machine translated from the source language, or
- destination language material for which translation into the source language has been previously requested; and based on the analyzing, modify the language model to account for the supplemental destination language training data.

14. The apparatus of claim 13, wherein the supplemental destination language training data comprises posts from a social network.

15. The apparatus of claim 13, wherein the supplemental destination language training data contains training material in one or more domains associated with the source language.

16. The apparatus of claim 13, wherein the supplemental destination language training data comprises untranslated destination language material that includes topics similar to topics found in translated destination language material.

17. The apparatus of claim 13, wherein:
the translation system applies a model selected from a plurality of models for translating the source material into the destination material;
the plurality of models comprise:
- a first language model targeted to a first demographic group, and
- a second language model targeted to a second demographic group; and the processor is further configured to:
- analyze demographic information of an originator of a request to translate the source material into the destination language;
- select the first language model or the second language model based on the demographic information; and
- apply the selected language model to translate the source material.

* * * * *